United States Patent [19]

Nakamura et al.

[11] Patent Number: 5,576,254
[45] Date of Patent: Nov. 19, 1996

[54] CARBON REFRACTORY FOR BLAST FURNACE AND METHOD FOR MANUFACTURING SUCH CARBON REFRACTORY

[75] Inventors: Hitoshi Nakamura, Kimitsu; Yorihito Mikami, Ohita; Yutaka Takusagawa, Ihara-gun; Tsutomu Wakasa, Fuji, all of Japan

[73] Assignees: Nippon Steel Corporation; Nippon Electrode Company, Ltd., both of Tokyo, Japan

[21] Appl. No.: 526,954

[22] Filed: Sep. 12, 1995

[30] Foreign Application Priority Data

Sep. 14, 1994 [JP] Japan ................................ 6-219743

[51] Int. Cl.⁶ ............................ L04B 35/52; L04B 35/532
[52] U.S. Cl. ............................................ 501/100; 501/128
[58] Field of Search ............................... 501/100, 99, 128

[56] References Cited

U.S. PATENT DOCUMENTS

| 4,471,059 | 9/1984 | Yoshino et al. | 501/100 X |
| 4,639,474 | 1/1987 | Vezza | 501/100 X |
| 5,246,897 | 9/1993 | Ono et al. | 501/100 X |
| 5,250,479 | 10/1993 | Rancoule et al. | 501/100 X |

FOREIGN PATENT DOCUMENTS

| 5618559 | 3/1977 | Japan. |
| 5843350 | 6/1980 | Japan. |
| 613299 | 12/1984 | Japan. |

OTHER PUBLICATIONS

"Recent Progress in Carbon Block Characteristics for Blast Furnace Hearths", by M. Miwa et al., Taikabutsu Overseas, vol. 2, No. 1, 1982 no month.

"Some Topical Problems of the Carbon Lining of Blast Furnaces", by S. Wilkening, Ironmaking Proceedings, vol. 38, Detroit 1979 no month.

*Primary Examiner*—Karl Group
*Attorney, Agent, or Firm*—Price, Gess & Ubell

[57] ABSTRACT

An artificial coarse-grain aggregate with particle size of 1–5 mm is prepared by adding alumina particulates as an agent for preventing molten iron erosion, metallic silicon particulates as a pore-size reducing agent, and organic binder to flake graphite with high thermal conductivity or to artificial graphite with particle size of 1 mm or less or to a mixture of both types of graphite, and then by kneading, molding, baking, crushing, and screening. By compounding the coarse-grain aggregate thus manufactured instead of the conventional coarse-grain aggregate of calcined anthracite, artificial graphite, or flake graphite to manufacture carbon refractories, large-sized carbon refractories for blast furnaces, with high thermal conductivity and resistance to molten iron, may be manufactured at high yields. In result, the obtained carbon refractories are favorable as lining material for the basin parts of blast furnaces.

11 Claims, No Drawings

CARBON REFRACTORY FOR BLAST FURNACE AND METHOD FOR MANUFACTURING SUCH CARBON REFRACTORY

BACKGROUND OF THE INVENTION

1. Field of the Invention

The present invention concerns a large carbon refractory, which is suitable as lining material for the side walls and bottom sections of blast furnace basins, and a method of manufacturing such a large carbon refractory.

2. Description of the Prior Art

Carbon refractories are generally manufactured by adding organic binder, such as coal-tar pitch, phenol resin, etc. to a carbon aggregate, such as coke, artificial graphite, flake graphite, amorphous graphite, or calcined anthracite, and then kneading the mixture and forming the mixture by extrusion or compression molding and thereafter baking the molded product in coke breeze packing.

Carbon refractories have excellent thermal conductivity and resistance to slag in comparison to fireclay bricks. Since it is also easy to manufacture large blocks from carbon refractories, they have been used from the past in the lining of the basin part of blast furnaces. However, the longevity of carbon refractories have not reached satisfactory levels.

The causes of damage of carbon refractory linings within blast furnace include carburization dissolution into the molten iron, structural destruction accompanying the penetration of molten iron into the pores and temperature fluctuation, formation of cracks due to the penetration of and reaction with alkali and zinc vapors and formation of cracks due to thermal stress, etc.

Various proposals concerning the formulation, manufacturing conditions, usage methods, etc. of carbon refractories have been proposed and implemented in order to extend the longevity of carbon refractories. The present applicant has also disclosed, in Japanese patent publication No. Sho-56-18559, blast furnace carbon refractories, with a low molten iron erosion rate, obtained by selecting calcined anthracite of low molten iron erosion rate (½ that of pitch coke, ¼ that of artificial graphite, ½ that of amorphous graphite) and adding 2–30% of metal oxides such as α-alumina, zircon, and magnesia to this anthracite.

The present applicant has also disclosed, in Japanese patent publication No. Sho-58-43350, a method of manufacturing blast furnace carbon refractories, in which 5–15 parts of metallic silicon particulates and 15–25 parts of coal-tar pitch are added to 75–85 parts of carbon aggregate mainly composed of anthracite and the mixture is kneaded, molded, and baked so that whisker-like silicon compounds form within the pores of the carbon refractory to lessen the pores with a pore size of 1 μm or more into which molten metal can penetrate and to thus reduce the penetration of molten iron and reactive gases.

Furthermore, the present applicant has disclosed, in Japanese patent publication No. Sho-61-3299, a method of manufacturing blast furnace carbon refractories characterized by kneading a mixture composed of 40–60 parts of flake graphite with a particle size of 0.3–3 mm, 15–30 parts of artificial graphite with a particle size of 0.1–4.5 mm, 10–20 parts of silicon carbide with a particle size of 0.074 mm or less, and 5–15 parts of metal powder upon adding organic solvents and phenol resin solution as a binder, then by adding phenol resin powder and then kneading further, and then by molding, drying, and baking.

The carbon refractory made by the above manufacturing method was satisfactory, having a large thermal conductivity and small permeability and suffering little molten metal penetration and carburization dissolution. However, since the flake graphite was used as it is in the flake form, its strong orientation properties presented a big disadvantage. That is, although the properties in the direction parallel to the alignment of particles were excellent, the thermal conductivity and bending strength in the perpendicular direction were inadequate. Furthermore, although medium-sized blocks could be manufactured with this carbon refractory, when it came to manufacturing large blocks such as blocks with a size of 600×700×2500 mm, the spring back during molding was large and laminations and cracks formed easily, making the product yield low.

In order to prevent the damaging of blast furnace carbon refractories, it is required that; (1) the carburization dissolution into the molten iron be made small, (2) the pores be made small to reduce the penetration of molten metal and reactive gases, and (3) the thermal conductivity be made high to reduce destruction by thermal stress.

The carbon refractory inside a blast furnace is not damaged uniformly and the level of damage differs according to the location. It is preferable to use carbon refractories of high thermal conductivity at sections of severe damage and to increase the safety level of such sections by locating the 1150° C. solidification line of the molten iron away from the shell. The addition of artificial graphite or flake graphite is effective in increasing the thermal conductivity of anthracite refractories with a thermal conductivity of 13 W/(m.K). However, artificial graphite aggregates have many large pores with a pore size of 1 μm or more into which molten iron may penetrate easily and the level of carburization dissolution into the molten iron is also high. With flake graphite aggregates, laminations tend to occur easily due to the strong orientation and the manufacturing of large blocks is difficult as described above.

In general, a particle size formulation, composed of 20–45% of coarse grains with particle size of 1–5 mm or 1–10 mm, is used for aggregates for manufacturing large refractories for blast furnaces, etc. If a particle size formulation contains a low amount of coarse grains, the large heat shrinkage in the baking process will lower the product yield by causing baking cracks and will thus make stable manufacturing of large blocks difficult. If flake graphite is used as it is in the flake form as a coarse-grain aggregate, it will present problems such as spring back during molding. Furthermore, if coarse grains of artificial graphite are added as they are, the coarse artificial graphite grains at the machined surface of the blast furnace refractory will dissolve preferentially into the molten iron, causing the surface to be eroded in a pitted manner and leading to the progress of erosion into the interior of the structure.

SUMMARY OF THE INVENTION

Object of the Invention

It is an object of the invention to provide a large carbon refractory for blast furnaces, which carbon refractory has sizes of up to 600×700 ×2500 mm and yet suffers little molten iron erosion and alkali attack and has high thermal conductivity, and a method of manufacturing such a large carbon refractory by which such a large carbon refractory can be manufactured in a stable manner.

Features and Advantages of the Invention

The invention provides methods for manufacturing of a large carbon refractory for a blast furnace characterized by using an artificial coarse-grain aggregate with a particle size, for example, of 1–5 mm, said artificial coarse-grain aggregate made by the steps of:

making a carbon block, with resistance to molten iron and alkali, with low permeability, and with good thermal conductivity, by adding organic binder to a mixture composed of 70–90 parts by weight of carbon raw material, with high thermal conductivity and a content of 70% by weight or more of flake graphite or artificial graphite with a particle size of 1 mm or less or of a mixture of both types of graphite, 5–15 parts by weight of alumina particulates, and 5–15 parts by weight of metallic silicon particulates and then by kneading, molding, and baking said mixture; and by processes of crushing and screening said carbon block.

UHP electrodes, which have high thermal conductivity among artificial graphite electrodes used for steelmaking, are preferred as the artificial graphite raw material. If the particle size of the artificial graphite raw material exceeds 1 mm, the artificial graphite grains exposed on the machined surface of the blast furnace refractory are dissolved preferentially and leads to the progress of pit-like erosion. In order to secure resistance to molten iron, alumina and metallic silicon must be added and the particle size of the artificial graphite raw material must be 1 mm or less. As for flake graphite, since the commercially available materials have a maximum particle size of approximately 3 mm and since they are originally flakes in form, there is no need to specify a maximum particle size.

The amount of alumina particulates added is preferably 5–15 wt %. An added amount of less than 5% will be inadequate while an amount in the excess of 15% will lower the thermal conductivity. As indicated in the prior applied Japanese patent application No. Sho-56-18559, the same effects may be obtained by adding particulates of highly refractive metal oxides such as zircon and magnesia instead of alumina. The amount of metallic silicon particulates is preferably 5–15 wt % since the pore size reduction effect will be inadequate with an amount of less than 5% while unreacted metallic silicon tends to remain when the amount exceeds 15%. Coal-tar pitch or phenol resin may be used as the organic binder.

By making a carbon block, with resistance to molten iron and alkali, with low permeability, and with good thermal conductivity, by kneading, molding, and baking a mixture made by adding alumina particulates, metallic silicon particulates, and organic binder to flake graphite and compounding an artificial aggregate obtained by crushing and screening said blocks, the orientation, which is characteristic of flake graphite, is eliminated and blast furnace carbon refractories with small anisotropy and high thermal conductivity can be manufactured at high yields.

By compounding an artificial aggregate, obtained by adding alumina particulates, metallic silicon particulates, and organic binder to artificial graphite with a particle size of 1 mm or less and then kneading, molding, baking, crushing, and screening, the preferential erosion of coarse grains by molten iron is prevented to thereby eliminate pit-like erosion and the thermal conductivity is improved. The molten iron erosion of carbon materials has a close relationship with the purity of the carbon material. With carbon materials of high ash content, a protective layer of ash content forms on the surface after dissolution of the carbon content into the molten iron. This prevents the contact of the carbon with the molten iron and thereby prevents further dissolution of the carbon into the molten iron. Artificial graphite is low in ash content and easily suffers molten iron erosion since a protective layer is not formed. However, when alumina particulates are added into artificial graphite with a particle size of 1 mm or less as in the invention, the alumina particulates become dispersed in the organic binder and cover the surface of the artificial graphite aggregate. A strong protective layer, which prevents molten iron erosion, is thus formed immediately when molten iron contacts the carbon and begins the erosion.

Furthermore, in the baking process of the green carbon body in coke breeze packing, the added metallic silicon particulates react with $N_2$ and $CO$ gas and form numerous whisker-like silicon compound crystals within the pores through a VSL (vapor, solid, liquid) mechanism to reduce the pore size. The permeability of the carbon refractory is thereby reduced and the molten iron and reactive gases are prevented from penetrating.

Although flake graphite suffers little molten iron erosion since it has an ash content of 10 wt %, the addition of alumina and metallic silicon will improve the resistance to molten iron further.

The carbon raw material for manufacturing the artificial aggregate must contain 70 wt % or more of high thermal conductivity flake graphite or artificial graphite or a combination of both. If the content of these is less than 70 wt %, a blast furnace refractory of high thermal conductivity cannot be obtained. Although baking cracks tend to form in large-sized blocks for the artificial coarse-grain aggregate since there are no coarse grains when this aggregate is manufactured, this does not present a problem since the manufactured blocks are crushed upon use. However, in order to prevent baking cracks of the blast furnace refractory, it is necessary for the coarse-grain aggregate to be thermally stable. It is thus preferable to set the baking temperature for manufacturing the artificial aggregate to be nearly the same as the baking temperature of the blast furnace refractory. The artificial coarse-grain aggregate obtained in the above manner has a smaller average pore size and a higher resistance to molten iron than coarse-grain aggregates of flake graphite, artificial graphite, amorphous graphite, calcined anthracite, coke, etc.

In the case where a blast furnace carbon refractory is obtained by compounding fine grains and particulates of artificial graphite, alumina particulates, and metallic silicon particulates with the artificial coarse-grain aggregate of the invention having artificial graphite as the main ingredient thereof and then adding organic binder to said compound and then kneading, molding, and baking at approximately 1250° C., the crushed grains of the carbon refractory thus obtained is deemed to be equivalent to the artificial coarse-grain aggregate of the invention. The crushed grains of the above-mentioned carbon refractory can thus be reused as the artificial coarse-grain aggregate for the blast furnace carbon refractory. However, recycled use will not be possible if flake graphite is used in the above case since the addition of flake graphite particulates will make the manufacturing of large-sized carbon refractories for blast furnaces difficult because of their orientation properties even when said artificial coarse-grain aggregate is used.

DETAILED DESCRIPTION

Preferred Embodiments

The invention shall now be described in more detail by way of examples.

Embodiment Example 1

A carbon raw material composed of 94 wt % flake graphite was prepared by adding 5 parts of carbon dust to 85 parts of flake graphite with particle size of 0.15–3 mm. Alumina particulates, metallic silicon particulates, and 14 outer parts of a binder composed of phenol resin and coal-tar pitch were then added in accordance with the formulation shown for Example 1 in "Table 1. Formulations for flake graphite artificial coarse-grain aggregates". The mixture was then kneaded well and molded into 640×720×2500 mm blocks at a molding pressure of 20 MPa. The molded products were then baked in coke breeze packing at 1250° C. to manufacture the blocks for artificial coarse-grain aggregate. Baking cracks formed in 80% of the blocks made at this time. The thermal conductivity of the blocks was 112 W/(m.K) in the parallel direction to the orientation of particles and the bending strength was 16 MPa in the parallel direction to the orientation of particles and 4.7 MPa in the perpendicular direction to the orientation of particles. These block were crushed and screened to prepare an artificial coarse-grain aggregate with a particle size of 1–5 mm. A blast furnace carbon refractory was then manufactured using this artificial coarse-grain aggregate and according to the formulation shown for Example 1 in Table 2. Though the kneading, molding, baking, and other manufacturing conditions were as described above, since the artificial coarse-grain aggregate was compounded, a satisfactory baking yield of 99% was obtained and lamination was not seen. As shown in the column for Example 1 in Table 2, with regards to the properties of the product, the thermal conductivity and resistance to molten iron were excellent and the anisotropy, which is characteristic of flake graphite, was remedied, leading to an improvement in the strength in the perpendicular direction.

Embodiment Example 2

An artificial coarse-grain aggregate was prepared using the same method of manufacturing the coarse-grain aggregate of Example 1 with the exception that the flake graphite content of the carbon raw material was set to 72 wt % by adding calcined anthracite as shown by the formulation for the coarse-grain aggregate of Example 2 in Table 1. This coarse-grain aggregate was then used to manufacture a carbon refractory for blast furnaces. As shown by Table 2, with regards to the product properties, the thermal conductivity in the parallel direction to the orientation of particles was 30 W/(mK) or more and the bending strength and the resistances to molten iron and alkali were also good.

TABLE 1

Formulations and properties for flake graphite artificial coarse-grain aggregates.

| | | Coarse-grain aggregate of Example 1 | Coarse-grain aggregate of Example 2 | Coarse-grain aggregate of Example 5 | Coarse-grain aggregate of Comparison Example 1 |
|---|---|---|---|---|---|
| Carbon raw material (parts) | Flake graphite (0.15–3 mm) | 85 | 65 | 30 | 40 |
| | Artificial graphite (0.074–1 mm) | 0 | 0 | 35 | 0 |
| | Calcined anthracite (0.074–1 mm) | 0 | 20 | 5 | 40 |
| | Same as the above (0.074 mm or less) | 0 | 0 | 15 | 5 |
| | Carbon dust | 5 | 5 | 5 | 5 |
| | (Graphite content (%)) | (94) | (72) | (72) | (44) |
| α-alumina particulates | | 5 | 5 | 5 | 5 |
| Metallic silicon particulates | | 5 | 5 | 5 | 5 |
| Organic binder | | 14 | 14 | 15 | 15 |
| Thermal conductivity of baked product W/(m · K) | | | | | |
| Parallel | | 112 | 87 | 65 | 48 |
| Perpendicular | | 24 | 23 | 34 | 21 |

TABLE 2

Formulations and properties of carbon refractories for blast furnaces (flake graphite artificial coarse-grain aggregates).

| | | Example 1 | Example 2 | Example 5 | Comparison Example 1 | Comparison Example 2 |
|---|---|---|---|---|---|---|
| Aggregate formulation (parts) | Coarse grains (1–5 mm) | | | | | |
| | Calcined anthracite | 0 | 0 | 0 | 0 | 20 |
| | Flake graphite | 0 | 0 | 0 | 0 | 10 |
| | Artificial coarse-grain aggregate | 30 | 30 | 30 | 30 | 0 |

TABLE 2-continued

Formulations and properties of carbon refractories for blast furnaces (flake graphite artificial coarse-grain aggregates).

|  |  | Example 1 | Example 2 | Example 5 | Comparison Example 1 | Comparison Example 2 |
|---|---|---|---|---|---|---|
|  | Fine grains (0.074–1 mm) |  |  |  |  |  |
|  | Calcined anthracite | 20 | 20 | 20 | 20 | 10 |
|  | Artificial graphite | 10 | 10 | 10 | 10 | 10 |
|  | Flake graphite | 0 | 0 | 0 | 0 | 10 |
|  | Particulates (0.074 mm or less) |  |  |  |  |  |
|  | Calcined anthracite | 20 | 20 | 10 | 20 | 20 |
|  | Artificial graphite | 10 | 10 | 20 | 10 | 10 |
|  | α-alumina particulates | 5 | 5 | 5 | 5 | 5 |
|  | Metallic silicon particulates | 5 | 5 | 5 | 5 | 5 |
| Organic binder (parts) |  | 17 | 17 | 17 | 18 | 18 |
| Properties | Bulk density | 1.77 | 1.74 | 1.76 | 1.70 | 1.76 |
|  | Bending strength (MPa) |  |  |  |  |  |
|  | Parallel | 16 | 15 | 16 | 16 | 18 |
|  | Perpendicular | 12 | 13 | 14 | 13 | 7.4 |
|  | Thermal conductivity (W/(m · K)) |  |  |  |  |  |
|  | Parallel | 38 | 31 | 33 | 22 | 36 |
|  | Perpendicular | 27 | 23 | 27 | 17 | 17 |
|  | Molten iron erosion index[1] | 43 | 41 | 47 | 40 | 45 |
|  | Surface condition | Smooth | Smooth | Smooth | Smooth | Smooth |
|  | Resistance to alkali (%)[2] | 0.35 | 0.46 | 0.30 | 0.55 | 0.59 |

[1] Indicated as a relative value with the molten iron eroded volume of Comparison Example 5 being set to 100.
[2] Indicated as the residual expansion rate after burying in coke-alkali mixture (Coke: $K_2CO_3$ = 1:4) at 1300° C. for 30 hours and then cooling to room temperature.

Comparison Example 1

An artificial coarse-grain aggregate was prepared with the same method used in manufacturing the coarse-grain aggregate of Example 1 with the exception that the flake graphite content of the carbon raw material was set to 44 wt % as shown by the formulation for the coarse-grain aggregate of Comparison Example 1 in Table 1. This coarse-grain aggregate was then used to manufacture a carbon refractory for blast furnaces. As shown by Table 2, with regards to the product properties, the thermal conductivity was low and there were no great differences with conventional products.

Comparison Example 2

A blast furnace carbon refractory was manufactured by the same method for manufacturing the coarse-grain aggregate of Example 1 with the exception that the artificial coarse-grain aggregate of the invention was not used and a conventional mixture of calcined anthracite and flake graphite was used as the coarse grains as shown in Table 2. With Comparison Example 2, there was much lamination, the calcination yield was 70%, and the anisotropy was large, with the strength and thermal conductivity being low in the direction perpendicular to the orientation of particles (in the pressurizing direction for molding).

Embodiment Example 3

The raw material formulations for manufacturing artificial graphite coarse-grain aggregates are shown in Table 3. Carbon raw material, composed of 94 wt % artificial graphite, was prepared based on the formulation for the coarse-grain aggregate for Example 3 by mixing 45 parts of fine-grain artificial graphite, with particle size of 0.074–1 mm and obtained by pulverizing UHP graphite electrodes for steelmaking, 35 parts of UHP graphite particulates with a particle of size of 0.074 mm or less, and 5 parts of carbon dust. To this were added and mixed, 7 parts of alumina particulates and 8 parts of metallic silicon particulates. 25 outer parts of a mixture of phenol resin and coal-tar pitch were added further as a binder and artificial coarse-grain aggregate blocks were manufactured using the same method of manufacturing the coarse-grain aggregates of Example 1. Although cracking occurred in 60% of the blocks in baking process, the properties were good, with the thermal conductivity being 38 W/(m.K) and the molten iron erosion index being 54. These blocks were crushed and screened to manufacture artificial coarse-grain aggregates with a particle size of 1–5 mm. A blast furnace carbon refractory was manufactured using this artificial coarse grain aggregate and according to the formulation shown for Example 3 in Table 4 and in the same manner as in Example 1. Since the artificial coarse-grain aggregate was compounded, there were hardly any baking cracks and a good baking yield of 99.5% was obtained. In terms of product properties, the product had excellent thermal conductivity and resistances to alkali and molten iron as shown in Table 4 and pit-like erosion by molten iron was not seen.

Embodiment Example 4

Carbon raw material, composed of 71% artificial graphite, was prepared by adding anthracite and based on the formulation for the coarse-grain aggregate of Example 4 shown in Table 3. To this were added alumina, metallic silicon, and binder and blocks for artificial coarse-grain aggregate were manufactured in the same manner as in the manufacturing of the coarse-grain aggregates of Example 1. The thermal conductivity of the block was 32 W/(m.K). Blast furnace carbon refractory was then made using an artificial coarse-grain aggregates with particle size of 1–5 mm prepared by crushing the above blocks and according to the formulation for Example 4 shown in Table 4 and in the same manner as Example 1. As shown in Table 4, in terms of product properties, the thermal conductivity exceeded the targeted value of 30 W/(m.K), the resistances to alkali and molten metal were excellent, and pit-like erosion by molten iron was not seen.

TABLE 3

Formulations for artificial graphite artificial coarse-grain aggregates.

| | | Coarse-grain aggregate of Example 3 | Coarse-grain aggregate of Example 4 | Coarse-grain aggregate of Comparison Example 3 |
|---|---|---|---|---|
| Carbon raw material (parts) | Artificial graphite (0.074–1 mm) | 45 | 45 | 40 |
| | Artificial graphite (0.074 mm or less) | 35 | 15 | 0 |
| | Calcined anthracite (0.074–1 mm) | 0 | 0 | 5 |
| | Same as the above (0.074 mm or less) | 0 | 20 | 35 |
| | Carbon dust | 5 | 5 | 5 |
| | (Artificial graphite content (%)) | (94) | (71) | (47) |
| α-alumina particulates | | 7 | 7 | 7 |
| Metallic silicon particulates | | 8 | 8 | 8 |
| Organic binder | | 25 | 25 | 25 |

TABLE 4

Formulations and properties of carbon refractories for blast furnaces (artificial graphite artificial coarse-grain aggregate).

| | | Example 3 | Example 4 | Comparison Example 3 | Comparison Example 4 | Comparison Example 5 |
|---|---|---|---|---|---|---|
| Aggregate formulation (parts) | Coarse grains (1–5 mm) | | | | | |
| | Calcined anthracite | 0 | 0 | 0 | 0 | 30 |
| | Artificial graphite | 0 | 0 | 0 | 30 | 0 |
| | Artificial coarse-grain aggregate | 30 | 30 | 30 | 0 | 0 |
| | Fine grains (0.074–1 mm) Artificial graphite | 30 | 30 | 30 | 30 | 30 |
| | Particulates (0.074 mm or less) Artificial graphite | 20 | 20 | 20 | 20 | 20 |
| | Carbon dust | 5 | 5 | 5 | 5 | 5 |
| | α-alumina particulates | 7 | 7 | 7 | 7 | 7 |
| | Metallic silicon particulates | 8 | 8 | 8 | 8 | 8 |
| Organic binder (parts) | | 23 | 23 | 23 | 24 | 18 |
| Properties | Ash content (%) | 21.5 | 21.7 | 21.9 | 15.7 | 17.3 |
| | Bulk density | 1.79 | 1.77 | 1.75 | 1.77 | 1.74 |
| | Compressive strength (MPa) | 64 | 67 | 63 | 56 | 45 |
| | Thermal conductivity (W/(m · K)) | 38 | 31 | 23 | 42 | 20 |
| | Molten iron erosion index[1] | 55 | 54 | 51 | 130 | 100 |
| | Surface condition | Smooth | Smooth | Smooth | Large pits | Large pits |
| | Resistance to alkali (%)[2] | 0.13 | 0.20 | 0.37 | 0.10 | 0.45 |

[1] Indicated as a relative value with the molten iron eroded volume of Comparison Example 5 being set to 100.
[2] Indicated as the residual expansion rate after burying in coke-alkali mixture (Coke: $K_2CO_3$ = 1:4) at 1300° C. for 30 hours and then cooling to room temperature.

Comparison Example 3

Carbon raw material, composed of 47 wt % artificial graphite, was prepared and based on the formulation for the coarse-grain aggregate of Comparison Example 3 shown in Table 3 and blocks for artificial coarse-grain aggregate were manufactured in the same manner as in the manufacturing of the coarse-grain aggregates of Example 1. The thermal conductivity of the block was 21 W/(m.K). Blast furnace carbon refractory was then made using artificial coarse-grain aggregates with particle size of 1–5 mm prepared by crushing the above blocks and according to the formulation for Comparison Example 3 shown in Table 4 and in the same manner as Example 1. As shown in Table 4, in terms of product properties, although the resistance to molten iron was excellent, the thermal conductivity was 23 W/(m.K) and was comparable to the thermal conductivities of conventional anthracite-type carbon refractories for blast furnaces.

Comparison Examples 4 and 5

Blast furnace carbon refractories were made in the conventional manner in Comparison Examples 4 and 5 using coarse grains of artificial graphite and coarse grains of calcined anthracite, respectively, instead of the artificial coarse-grain aggregate of Example 3. As shown in Table 4, the formulations for both Comparison Examples were the same except for the amount of binder. In the case of Comparison Example 4, in which conventional coarse grains of artificial graphite were used, the product had a high thermal conductivity and excellent resistance to alkali but was significantly poor in terms of resistance to molten iron and suffered pit-like erosion by molten iron. In the case of Comparison Example 5, in which conventional coarse grains of anthracite were used, the thermal conductivity was small and the resistance to molten iron was not very high.

Embodiment Example 5

An artificial coarse-grain aggregate, having a combined content of flake graphite and artificial graphite within the carbon raw material of 72 wt % as shown in the formulation for Example 5 in Table 1, was made in the same manner as in the manufacturing of the coarse-grain aggregate of Example 1 and a blast furnace carbon refractory was made using this aggregate. As shown in the column for Example 5 in Table 2, this product showed substantially good values for all of the required product properties.

Effect of the Invention

With conventional methods in which calcined anthracite, artificial graphite, amorphous graphite, or flake graphite, etc. is used as it is as the coarse-grain aggregate, the properties required of blast furnace carbon refractories could not be satisfied and the manufacturing of large-sized blocks was difficult.

By compounding artificial coarse-grain aggregates manufactured by compounding alumina and metallic silicon with flake graphite and/or artificial graphite with particle size of 1 mm or less as in the invention, large carbon refractories for blast furnaces with high thermal conductivity and high resistances to alkali and molten iron may be manufactured easily. The selection of thermal conductivities of carbon refractodes is thereby enabled to facilitate the design of linings that extend the longetivity of blast furnaces.

What is claimed is:

1. A carbon refractory for a blast furnace formed by a process comprising:

a synthetic coarse-grain aggregate with a particle size of 1 to 5 mm which is formed from a mixed material that is baked, crushed, and screened;

the mixed material consisting of adding an organic binder to 100 weight parts of a mixture of 70 to 90 weight parts of carbon material having a content of 70 wt % or more of one of flake graphite, artificial graphite, or a mixture thereof, 5 to 15 parts by weight of alumina particulates, and 5 to 15 parts by weight of metallic silicon particulates.

2. The carbon refractory of claim 1 wherein the artificial graphite has a particle size of 1 mm or less.

3. The carbon refractory of claim 1 wherein the flake graphite has a particle size of 3 mm or less.

4. The carbon refractory of claim 1 wherein the mixture is baked at approximately 1250° C.

5. A carbon refractory lining for a blast furnace, comprising:

blocks of material of approximately 600×700×2500 mm in size, the material formed from a mixture having particles of a size of 1 to 5 mm, the material being formed from the mixture after it is baked, crushed, screened, and molded;

the mixture consisting of adding an organic binder to 100 parts by weight of a mixture of 70 to 90 parts of 70 to 90 parts by weight of carbon material having a high thermal conductivity and a content of 70% by weight or more of one of flake graphite, artificial graphite, or a mixture thereof, 5 to 15 parts by weight of alumina particulates, and 5 to 15 parts by weight of metallic silicon particulates;

the blocks of material having a thermal conductivity of at least 30 W(mk) in a direction parallel to an orientation of particles and forming a protective layer of alumina particulates with silicon compound crystals formed within pores in the blocks to lessen permeability.

6. A carbon refractory for a blast furnace that is obtained by compounding at least coarse-grain carbon aggregate with a particle size of 1 to 5 mm and fine-grain carbon aggregate with a particle size of 1 mm or less, said carbon refractory comprising:

the coarse-grain carbon aggregate comprising a synthetic coarse-grain carbon aggregate, which is obtained by adding organic binder to 100 weight parts of a mixture to provide a mixed material, and then by kneading, molding, baking, crushing, and screening the mixed material;

the mixture composed of 70 to 90 weight parts of carbon material having a flake graphite content of 70 wt % or more, 5 to 15 weight parts of alumina particulates, and 5 to 15 weight parts of metallic silicon particulates.

7. A carbon refractory for a blast furnace that is obtained by compounding at least coarse-grain carbon aggregate with a particle size of 1 to 5 mm and fine-grain carbon aggregate with a particle size of 1 mm or less, said carbon refractory comprising:

the coarse-grain carbon aggregate comprising a synthetic coarse-grain carbon aggregate, which is obtained by adding organic binder to 100 weight parts of a mixture to provide a mixed material, and then by kneading, molding, baking, crushing, and screening the mixed material;

the mixture composed of 70 to 90 weight parts of carbon material having a content of 70 wt % or more of graphite with a particle size of 1 mm or less, 5 to 15 weight parts of alumina particulates, and 5 to 15 weight parts of metallic silicon particulates.

8. A carbon refractory for a blast furnace that is obtained by compounding at least coarse-grain carbon aggregate with a particle size of 1 to 5 mm and fine-grain carbon aggregate with a particle size of 1 mm or less, said carbon refractory comprising:

the coarse-grain carbon aggregate comprises a synthetic coarse-grain carbon aggregate, which is obtained by adding organic binder to 100 weight parts of a mixture to provide a mixed material, and then by kneading, molding, baking, crushing, and screening the mixed material;

the mixture composed of 70 to 90 weight parts of carbon material having a combined content of 70 wt % or more of flake graphite and graphite with a particle size of 1 mm or less, 5 to 15 weight parts of alumina particulates, and 5 to 15 weight parts of metallic silicon particulates.

9. A method for manufacturing a carbon refractory for a blast furnace by compounding at least coarse-grain carbon aggregate with a particle size of 1 to 5 mm and fine-grain carbon aggregate with a particle size of 1 mm or less, said method comprising steps as follows:

kneading a mixed material which consists of adding organic binder to 100 weight parts of a mixture, the mixture composed of 70 to 90 weight parts of carbon material having a flake graphite content of 70 wt % or more, 5 to 15 weight parts of alumina particulates, and 5 to 15 weight parts of metallic silicon particulates;

molding the mixed material kneaded by the kneading step by applying pressure to it to form a molded product;

baking the molded product formed by the molding step to manufacture a block; and crushing and screening the block manufactured by the baking step to prepare a synthetic coarse-grain carbon aggregate with a particle size of 1 to 5 mm.

10. A method for manufacturing a carbon refractory for a blast furnace by compounding at least coarse-grain carbon aggregate with a particle size of 1 to 5 mm and fine-grain carbon aggregate with a particle size of 1 mm or less, said method comprising steps as follows:

kneading a mixed material which consists of adding organic binder to 100 weight parts of a mixture, the mixture composed of 70 to 90 weight parts of carbon material having a content of 70 wt % or more of graphite with a particle size of 1 mm or less, 5 to 15 weight parts of alumina particulates, and 5 to 15 weight parts of metallic silicon particulates;

molding the mixed material kneaded by the kneading step by applying pressure to it to form a molded product;

baking the molded product formed by the molding step to manufacture a block; and crushing and screening the block manufactured by the baking step to prepare a synthetic coarse-grain carbon aggregate with a particle size of 1 to 5 mm.

11. A method for manufacturing a carbon refractory for a blast furnace by compounding at least coarse-grain carbon aggregate with a particle size of 1 to 5 mm and fine-grain carbon aggregate with a particle size of 1 mm or less, said method comprising steps as follows:

kneading a mixed material which consists of adding organic binder to 100 weight parts of a mixture, the mixture composed of 70 to 90 weight parts of carbon material having a combined content of 70 wt % or more of flake graphite and graphite with a particle size of 1 mm or less, 5 to 15 weight parts of alumina particulates, and 5 to 15 weight parts of metallic silicon particulates;

molding the mixed material kneaded by the kneading step by applying pressure to it to form a molded product;

baking the molded product formed by the molding step to manufacture a block; and crushing and screening the block manufactured by the baking step to prepare a synthetic coarse-grain carbon aggregate with a particle size of 1 to 5 mm.

* * * * *